(12) United States Patent
Barrau et al.

(10) Patent No.: US 10,168,560 B2
(45) Date of Patent: Jan. 1, 2019

(54) METHOD OF CONTROLLING AN ACTIVE FILTERING DEVICE

(71) Applicant: Essilor International, Charenton-le-Pont (FR)

(72) Inventors: Coralie Barrau, Charenton-le-Pont (FR); Nicolas Lavillonniere, Charenton-le-Pont (FR); Benjamin Rousseau, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/541,318

(22) PCT Filed: Dec. 30, 2015

(86) PCT No.: PCT/EP2015/081422
§ 371 (c)(1),
(2) Date: Jun. 30, 2017

(87) PCT Pub. No.: WO2016/107904
PCT Pub. Date: Jul. 7, 2016

(65) Prior Publication Data
US 2018/0011360 A1    Jan. 11, 2018

(30) Foreign Application Priority Data

Dec. 30, 2015   (EP) .................................... 14307207

(51) Int. Cl.
*G02F 1/133*   (2006.01)
*G02C 7/10*   (2006.01)
(Continued)

(52) U.S. Cl.
CPC ....... *G02F 1/13318* (2013.01); *G02B 27/017* (2013.01); *G02B 27/0172* (2013.01);
(Continued)

(58) Field of Classification Search
CPC .............. G02F 1/0123; G02B 26/0841; G02B 26/0833; G02B 26/06; H04B 10/50575
(Continued)

(56) References Cited

U.S. PATENT DOCUMENTS

2005/0219034 A1*  10/2005  Yoshikawa ......... H01L 27/0802
                                                                338/9
2009/0204291 A1*   8/2009  Cernasov ............... G02C 7/101
                                                                701/36

OTHER PUBLICATIONS

ISR/WO for International Appln. No. PCT/EP2015/081422; dated May 24, 2016.

* cited by examiner

*Primary Examiner* — Mohammed Hasan
(74) *Attorney, Agent, or Firm* — Oblon, McClelland, Maier & Neustadt, L.L.P.

(57) ABSTRACT

Method of controlling an active filtering device comprising an active filter and a filter controller arranged to control the active filter, the method comprising:
a wearer location providing step, during which a location of a wearer is provided,
a luminous cartography providing step, during which a luminous cartography relating to the light sources in the environment of the wearer is provided, the luminous cartography depending at least on the location of the wearer,
a light exposure profile determining step, during which at least one part of the light exposure profile of the wearer is determined based at least on the luminous cartography and on the wearer location,
and an active filter controlling step, during which the active filter is controlled by the filter controller according to the determined light exposure profile of the wearer.

20 Claims, 2 Drawing Sheets

(51) Int. Cl.
*G02B 27/01* (2006.01)
*H05B 37/02* (2006.01)

(52) U.S. Cl.
CPC ......... *G02C 7/101* (2013.01); *H05B 37/0209* (2013.01); *G02B 2027/014* (2013.01); *G02B 2027/0118* (2013.01); *G02B 2027/0178* (2013.01)

(58) Field of Classification Search
USPC ....................................................... 359/239
See application file for complete search history.

METHOD OF CONTROLLING AN ACTIVE FILTERING DEVICE

BACKGROUND OF THE INVENTION

Field of the Invention

The invention relates to a method of controlling an active filtering device comprising an active filter and a filter controller arranged to control the active filter. The invention further relates to a network system comprising at least an active filtering device and a distant entity, and to a computer program product comprising one or more stored sequences of instructions that are accessible to a filter controller of an active filtering device.

Description of the Related Art

Light radiation according to their spectral range (UV, visible, IR) can be harmful and/or uncomfortable for people and, particularly for the wearer of optical equipment comprising optical lenses mounted in a spectacle frame.

In the contrary, some light radiations are benefic for the healthcare of people but generally with a maximal received dose during a predetermined period.

Therefore, it appears that there is a need to provide a method and the corresponding equipment that is arranged to manage light emission in the environment of a wearer.

BRIEF SUMMARY OF THE INVENTION

Thus, one object of the present invention is to provide an efficient method capable of manage light emission in the environment of a wearer without needing the use of complex system comprising a plurality of sensors.

To this end, the invention proposes a method of controlling an active filtering device comprising an active filter and a filter controller arranged to control the active filter, the method comprising:
  a wearer location providing step, during which a location of a wearer is provided,
  a luminous cartography providing step, during which a luminous cartography relating to the light sources in the environment of the wearer is provided, the luminous cartography depending at least on the location of the wearer,
  a light exposure profile determining step, during which at least one part of the light exposure profile of the wearer is determined based at least on the luminous cartography and on the wearer location,
  an active filter controlling step, during which the active filter is controlled by the filter controller according to the determined light exposure profile of the wearer.

Advantageously, the invention allows providing a method for managing light emission in the environment of a wearer in real time and without needing the use of complex system comprising a plurality of embedded sensors.

Thanks to the invention, the light exposure profile of the wearer can be enslaved to the wearer location, being based on the luminous cartography of light sources in the environment of the wearer and optionally on wearer parameters. This allows optimizing comfort and/or (visual) health of the wearer.

According to further embodiments of the method which can be considered alone or in combination:
  wherein the evolution of the wearer location is checked over time and the luminous cartography is updated according to the evolution over time of the wearer location and the hour of the day;
  the luminous cartography is a 3D-cartography;
  the active filter is configured to control a controller device of a head mounted display device comprising a light emitting source arranged to emit a light to an eye of the wearer when the head mounted display device is worn by the wearer, the controller device being adapted to control the emitted spectrum and/or intensity of the light emitted by the light emitting source;
  the controller device is configured so as to provide chronobiology regulation and/or affective disorders regulation by controlling the light emitting source to provide emission between 465 nm and 520 nm;
  the luminous cartography providing step comprises at least a step chosen among the list consisting of:
    a luminous cartography defining step, during which the luminous cartography in the environment of the wearer is defined based on predetermined light sources data,
    a luminous cartography measuring step, during which the luminous cartography in the environment of the wearer is measured by at least one light intensity sensor,
    a luminous cartography calculating step, during which the luminous cartography in the environment of the wearer is calculated based at least on a light sources parameter of a predetermined light sources data,
    a luminous cartography modelling step, during which the luminous cartography in the environment of the wearer is modelled based on models of light sources depending at least on a light sources parameter of a predetermined light sources data,
    a luminous cartography downloading step, during which the luminous cartography in the environment of the wearer is determined by downloading light source data from a luminous cartography database at a distant entity;
  at least the light sources in the environment of the wearer are controlled by a home automation device and wherein the luminous cartography providing step comprises:
    a light sources data receiving step, during which light sources data are received from the home automation device configured to control at least the light sources,
    a calculating step, during which the luminous cartography relating to light sources in the environment of the wearer is calculated based on the received light sources data;
  the light sources comprise natural light sources and/or artificial light sources;
  the active filter is configured to adapt the light exposure profile of the wearer depending on the light sources in the environment of the wearer;
  the active filter controlling step comprises:
    a command generating step, during which a command is generated according to the determined light intensity, the command specifying at least one ambient light effect to be generated by the light sources,
    a command transmitting step, during which the generated command is transmitted to the home automation device;
  the luminous cartography in the environment of the wearer depends at least on one parameter of light sources in the environment of the wearer among the list of light sources parameters consisting of: the number of the light sources, the activation states of the light sources, the spatial distributions of the light sources, the orientations of the light sources, the radiance of the light sources, the emission angles of the light sources, the emission spectra of the light sources;

the method further comprises a wearer parameter providing step, during which at least one wearer parameter is provided and wherein the active filter is controlled according to the at least one wearer parameter;

the wearer parameter comprises at least the age of the wearer and/or the chronotype of the wearer and/or the activity of the wearer and/or ocular diseases of the wearer and/or the physiological disorders of the wearer; and the method further comprises a predetermined threshold providing step, during which the value of a predetermined threshold is provided and wherein:

the light intensity determining step comprises a light dose determining step, during which the light intensity of at least a part of the wearer's environment is determined for a predetermined period based at least on the luminous cartography, on the time and on the wearer location, and the active filter controlling step comprises a comparing step during which the determined light dose is compared with the value of the predetermined threshold and during which the active filter is controlled by the filter controller according to the result of the comparison between the determined light dose and the value of the predetermined threshold.

Another object of the invention relates to a network system comprising at least an active filtering device and a distant entity, the active filtering device and the distant entity being configured so as to communicate one with the other, and the distant entity comprising storing means adapted to store at least one computer program product comprising one or more stored sequences of instructions that when executed by the filter controller of the active filter, causes the filter controller to control the active filter at least according to the determined light intensity, and/or the distant entity comprising storing means adapted to store at least predetermined light sources data that when used by the filter controller of the active filter, causes the filter controller to control the active filter at least according to the determined light intensity.

Another object of the invention relates to a network system comprising at least an active filtering device defined above and a distant entity, the active filtering device and the distant entity being configured so as to communicate one with the other, and the distant entity comprising storing means adapted to store at least one computer program product comprising one or more stored sequences of instructions that when executed by the filter controller of the active filter, causes the filter controller to control the active filter at least according to the determined light exposure profile of a wearer, and/or the distant entity comprising storing means adapted to store at least predetermined light sources data that when used by the filter controller of the active filter, causes the filter controller to control the active filter at least according to the determined light exposure profile of a wearer.

DETAILED DESCRIPTION OF THE INVENTION

According to a further aspect, the invention relates to a computer program product comprising one or more stored sequences of instructions that are accessible to a filter controller of an active filtering device, and which, when executed by the filter controller, causes the filter controller to control an active filter of the active filtering device at least according to the determined light intensity.

The invention further relates to a computer readable medium carrying one or more sequences of instructions of the computer program product according to the invention.

Furthermore, the invention relates to a program which makes a computer execute the method of the invention.

The invention also relates to a computer-readable storage medium having a program recorded thereon; where the program makes the computer execute the method of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or a Field Programmable Gate Array ("FPGA") or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE INVENTION

Other features and advantages of the present invention will become apparent from the following description of non-limitative embodiments, with reference to the following drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

The invention relates to a method of controlling an active filtering device arranged in the environment of a wearer. An example of active filtering device is illustrated on FIG. 1.

Figure 1:
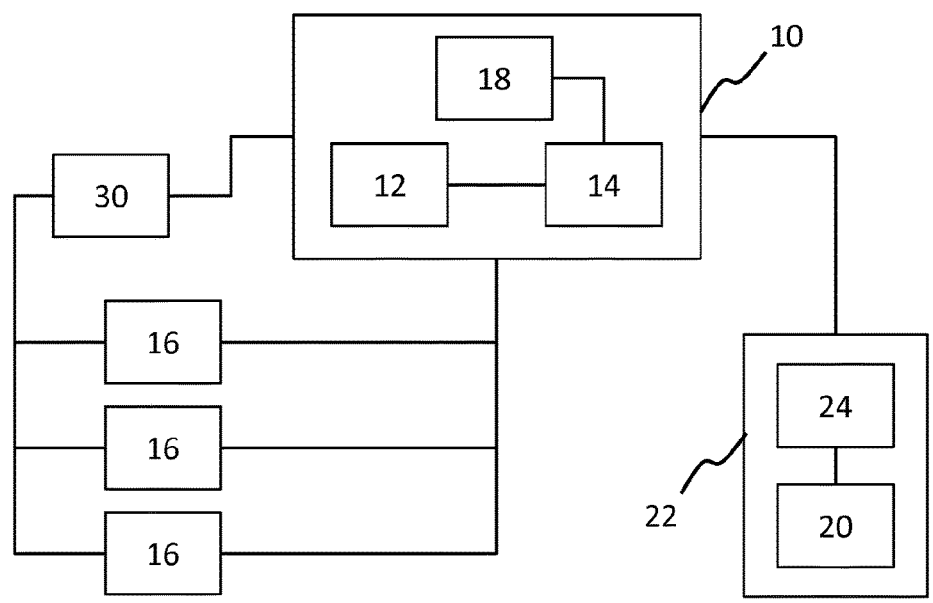
FIG. 1 is a block-diagram of an active filtering device used in a method according to the invention for controlling a HMD device or an automation device.

The active filtering device 10, represented on FIG. 1, comprises an active filter 12 and a filter controller 14 arranged to control the active filter 12. The filter controller 14 may comprise a processing circuit comprising a processor. The Processor can comprise one or more microprocessors, microcontrollers, and other analog and/or digital circuit components configured to perform the functions described herein. Processor may comprise one or more memories (e.g., random access memory, read only memory, flash, etc.) configured to store software applications provided during manufacture or subsequent to manufacture by the user or by a distributor of the active filtering device and/or data.

The active filter 12 can be a polarizer and/or a coloring filter, i.e. configured to transmit or absorb a predetermined wavelength or a predetermined spectral range. For example, the active filter can comprise a layer made of an active electro-material such that the transmission of the filter can vary under the action of an electric induced by individual electrodes. The layer can be made of cholesteric liquid crystals, each face of the layer being covered with a transparent electrically conducting layer.

Light sources 16 are further arranged in the environment of the wearer. The light sources 16 comprise natural light sources and/or artificial light sources. Each light source can be characterized by at least a light source parameter, for example its activation states, its location, its spatial distribution, its spectral distribution, its orientation, its radiance, its emission angles, its emission spectra and its coherence or diffusion properties.

Figure 2:
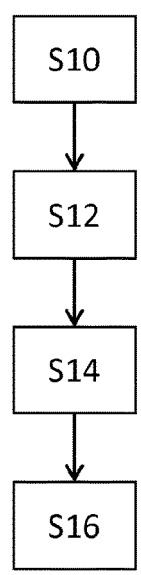
FIG. 2 is a flowchart representing the steps of a method according to an embodiment of the invention.
Figure 3:
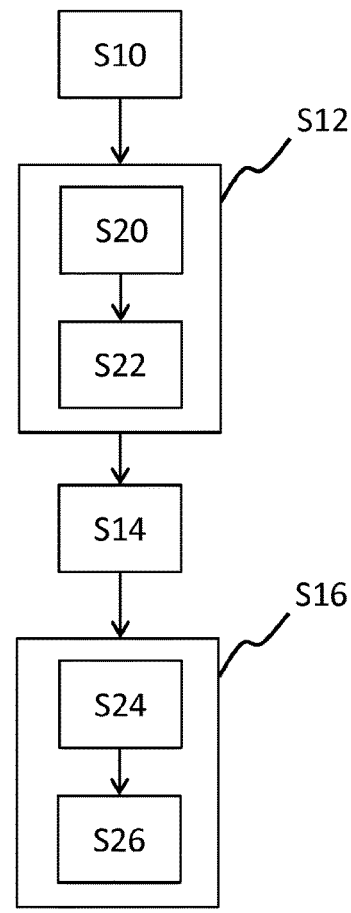
FIG. 3 is a flowchart representing the steps of a method according to a second embodiment of the invention.

With reference to FIG. 2, the method comprises at least:
- a wearer location providing step S10, during which a location of the wearer is provided,
- a luminous cartography providing step S12,
- a light exposure profile determining step S14,
- an active filter controlling step S16, during which the active filter is controlled by the filter controller according to the determined light exposure profile of the wearer.

During the wearer location providing step S10, the location of the wearer is provided for example thanks to a location determining application, as a GPS application. GPS application can communicate with and provide the location of the active filtering device 10 embedded in a device worn by the wearer at any given time.

During the luminous cartography providing step S12, a luminous cartography relating to the light sources in the environment of the wearer is provided. The luminous cartography depends at least on the location of the wearer.

Preferably, the luminous cartography is a 3D-cartography.

Furthermore, the luminous cartography depends at least on one parameter of light sources in the environment of the wearer among the list of light sources parameters, for example the number of the light sources, the activation states of the light sources, the spatial distributions of the light sources, the orientations of the light sources, the radiance of the light sources, the emission angles of the light sources, the emission spectra of the light sources.

The luminous cartography can be defined based on predetermined light sources data and/or measured by at least one light intensity sensor. The predetermined light sources data can comprise at least a light sources parameter of each light source.

Furthermore, the luminous cartography can be calculated based at least on a light sources parameter of a predetermined light sources data and/or modelled based on models of light sources depending at least on a light sources parameter of the predetermined light sources data.

Moreover, the luminous cartography can be determined by downloading light source data from a luminous cartography database at a distant entity.

Advantageously, the evolution of the wearer location is checked over time and the luminous cartography is updated according to the evolution over time of the wearer location and the time of the day to more accurately determine the light exposure profile of the wearer. To this end, the active filtering 10 device preferably comprises a clock 18 providing a time mark. The light exposure profile of the wearer is also determined based on the time mark.

During the light exposure profile determining step S14, at least one part of the light exposure profile of the wearer is determined based at least on the luminous cartography and on the wearer location. The light exposure profile of the wearer is the light emitted by the light sources in the environment of the wearer and arriving on him. It depends at least on a light source parameter of the light sources in the environment of the wearer, for example on activation states, location, spatial distribution, spectral distribution, radiance, orientation, emission spectra, emission angles of all the light sources in the environment of the wearer.

According to a first embodiment of the invention, the active filtering device 10 is configured to control a controller device 20 of a head mounted display (HMD) device 22 when the head mounted display device 22 is worn by the wearer.

The controller device 20 of the HMD display is configured to communicate with the active filtering device 10 at any given time.

The head mounted display device 22 comprises at least a light emitting source 24 arranged to emit a light to at least an eye of the wearer when the head mounted display device is worn by the wearer.

The controller device 20 of the HMD device 22 is adapted to control the emitted spectrum and/or intensity of the light emitted by the light emitting source 24.

For example, the controller device can be configured so as to provide chronobiology regulation and/or affective disorders regulation by controlling the light emitting source to provide emission between 465 nm and 520 nm.

According to a second embodiment of the invention compatible with the previous one, a home automation device 30 is arranged in the environment of the wearer. The home automation device 30 is configured to control at least light sources 16 in the environment of the wearer.

In this case, the luminous cartography providing step S12 can comprise:
- a light sources data receiving step S20, and
- a calculating step S22.

During the light sources data receiving step S20, light sources data are received from the home automation device 30 configured to control at least the light sources.

Then the luminous cartography relating to light sources in the environment of the wearer is calculated based on the received light sources data during the calculating step S22.

Moreover, the active filter can be configured to adapt the light exposure profile of the wearer depending on the light sources in the environment of the wearer, for example in order to increase or decrease the light arriving on the wearer and/or to modify at least a light source parameter, for example its activation states, its location, its spatial distribution, its spectral distribution, its orientation, its radiance, its emission angles, its emission spectra and its coherence or diffusion properties.

Preferably, the active filter controlling step S16 comprises:
- a command generating step S24, and
- a command transmitting step S26.

During the command generating step S24, a command is generated according to the predetermined light sources data and/or to the determined light intensity.

In an example, the command specifies at least one ambient light effect to be generated by the light sources, for example to turn down/up the intensity of at least one light source and/or to put a blind down/up in order to decrease/increase the radiance of natural light of the environment of the wearer. Then, the generated command is transmitted to the home automation device during the command transmitting step S26.

The active filter of the active filtering device can also be deported on any light source in the environment of the wearer. Thus, the active filtering device can be configured to control a plurality of active filters deported on the light sources in the environment of the wearer.

Preferably, the method according to the invention further comprises a wearer parameter providing step, during which at least one wearer parameter is provided.

Furthermore, the active filter is controlled according to the at least one wearer parameter. For example, a wearer parameter can be one or several among the list:
- the age of the wearer,
- the chronotype of the wearer,
- the activity of the wearer,
- ocular diseases of the wearer,
- the physiological disorders of the wearer.

Chronotype is an important predictor of sleep timings, sleep stability, sleep duration, sleep need, sleep quality, morning sleepiness, adaptability to shift work.

Chronotype is an attribute of human beings, reflecting at what time of the day their physical functions (hormone level, body temperature, cognitive faculties, eating and sleeping) are active, change or reach a certain level.

This chronotype is commonly reduced to sleeping habits only, referring to people as "larks" and "owls", which refer, respectively, to morning people (those who wake up early and are most alert in the first part of the day) and evening people (those who are most alert in the late evening hours and prefer to go to bed late).

Then, the active filter may be controlled in order to take into account the activity of the wearer, for example in order to prevent jet-lag, its light needs depending on its physiological disorders and/or its ocular diseases and/or its age.

Furthermore, the method can further comprise a predetermined threshold providing step, during which the value of a predetermined threshold is provided.

Then, the light exposure profile determining step S14 can comprise a light dose determining step, during which the light exposure profile of at least a part of the wearer's environment is determined for a predetermined period based at least on the luminous cartography, on the time and on the wearer location.

And the active filter controlling step S16 can comprise a comparing step during which the determined light dose is compared with the value of the predetermined threshold and during which the active filter is controlled by the filter controller according to the result of the comparison between the determined light dose and the value of the predetermined threshold.

Thus, light harmfulness thresholds or light need thresholds may be defined according to wearer related parameters by a practitioner or automatically by a pre-calculation, for examples:
- a daily, weekly or monthly maximum dose of light harmfulness, and particularly of toxic blue radiation, UV radiation, IR radiation, laser radiation,
- a maximum dose of light illumination allowed on a short period, and particularly of toxic blue radiation, UV radiation, IR radiation, laser radiation,
- a daily minimum dose of light illumination in order to satisfy the wearer's light need.

These thresholds may be updated over the time according to the luminous cartography and the location of the wearer.

The luminous cartography and the location of the wearer allow determining continuously for a plurality of wavelengths:
- a punctual luminous intensity arriving on the wearer, and/or
- a light dose arrived on the wearer during a predetermined period.

According to an embodiment of the invention, the active filtering device 10 according to the invention is part of an eyewear. The eyewear comprises, in particular, the active filter 12 and the filter controller 14 arranged to control the active filter 12.

The eyewear may be any eyewear such as corrective eyewear, non corrective eyewear, solar eyewear, head mounted device such as head mounted display device.

The active filter 12 is controlled by the filter controller 14 according to the determined light exposure profile of the wearer.

The active filter 12 is also configured to adapt the light exposure profile of the wearer depending on the light sources in the environment of the wearer.

In an example, the controller device can be configured to control the active filter according to the light dose arrived on the wearer.

In an example, the controller device can be configured so as to provide chronobiology regulation and/or affective disorders regulation by controlling the active filter to provide emission between 465 nm and 520 nm during specific period of time.

Figure 4:
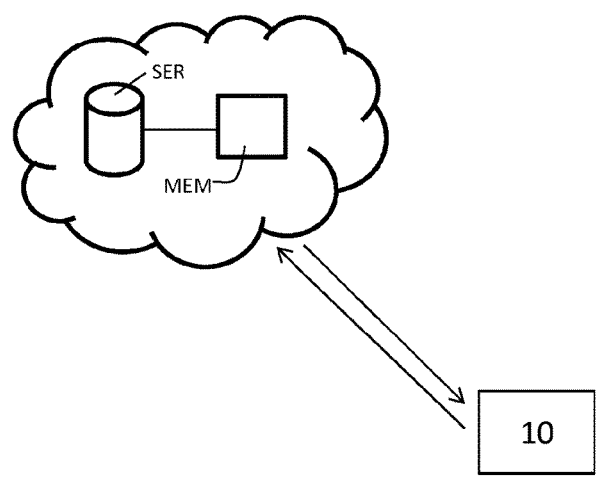
FIG. 4 represents a networked data-processing device according to the invention.

Another object of the invention is a network system comprising at least an active filtering device as described hereinbefore and a distant entity as illustrated on FIG. 4.

The active filtering device and the distant entity are configured so as to wireless communicate one with the other.

Furthermore, the distant entity comprises storing means.

The storing means are adapted to store at least one computer program product comprising one or more stored sequences of instructions that when executed by the filter controller of the active filter, causes the filter controller to control the active filter at least according to the determined light intensity.

According to another embodiment of the network system according to the invention, which is compatible with the previous one, the storing means of the distant entity are adapted to store at least predetermined light sources data that when used by the filter controller of the active filter, causes the filter controller to control the active filter at least according to the determined light intensity.

In an embodiment, the storing means are adapted to store at least one computer program product comprising one or more stored sequences of instructions that when executed by the filter controller of the active filter, causes the filter controller to control the active filter at least according to the determined light exposure profile of the wearer.

According to another embodiment of the network system according to the invention, which is compatible with the previous one, the storing means of the distant entity are adapted to store at least predetermined light sources data that when used by the filter controller of the active filter, causes the filter controller to control the active filter at least according to the determined light exposure profile of the wearer.

The invention has been described above with the aid of embodiments without limitation of the general inventive concept as defined in the claims.

Many modifications and variations will suggest themselves to those skilled in the art upon making reference to the foregoing illustrative embodiments, which are given by way of example only and which are not intended to limit the scope of the invention, that being determined solely by the appended claims.

For example, the "luminous" cartography can be extended to a broader cartography related to other electromagnetic waves as UV radiation, IR radiation . . . .

The invention claimed is:

1. A method of controlling an active filtering device comprising an active filter and a filter controller arranged to control the active filter, the method comprising:
    obtaining a wearer location;
    obtaining a luminous cartography relating to light sources in an environment of the wearer, the luminous cartography depending at least on the location of the wearer;
    determining at least one part of a light exposure profile of the wearer based at least on the luminous cartography and on the wearer location; and
    controlling an active filter by the filter controller according to the determined light exposure profile of the wearer.

2. The method according to claim 1, wherein an evolution of the wearer location is checked over time and the luminous cartography is updated according to the evolution of the wearer location over time and an hour of the day.

3. The method according to claim 1, wherein the luminous cartography is a 3D-cartography.

4. The method according to claim 1, further comprising at least a step chosen among:
    defining the luminous cartography in the environment of the wearer based on predetermined light sources data;
    measuring the luminous cartography in the environment of the wearer by at least one light intensity sensor;
    calculating the luminous cartography in the environment of the wearer based at least on a light sources parameter of a predetermined light sources data;
    modelling the luminous cartography in the environment of the wearer based on models of light sources depending at least on a light sources parameter of a predetermined light sources data; and
    determining the luminous cartography in the environment of the wearer by downloading light source data from a luminous cartography database at a distant entity.

5. The method according to claim 1, wherein the light sources in the environment of the wearer are controlled by a home automation device, and
    wherein the method further comprises:
    receiving light sources data from the home automation device configured to control at least the light sources; and
    calculating the luminous cartography relating to the light sources in the environment of the wearer based on the received light sources data.

6. The method according to claim 5, wherein the active filter is configured to adapt the light exposure profile of the wearer depending on the light sources in the environment of the wearer.

7. The method according to claim 5, wherein the method further comprises:
    generating a command according to a determined light intensity, the command specifying at least one ambient light effect to be generated by the light sources; and
    transmitting the generated command to the home automation device.

8. The method according to claim 1, wherein the luminous cartography in the environment of the wearer depends at least on one parameter of light sources in the environment of the wearer among a list of light sources parameters consisting of: a number of the light sources, an activation states of the light sources, spatial distributions of the light sources, orientations of the light sources, a radiance of the light sources, emission angles of the light sources, and an emission spectra of the light sources.

9. The method according to claim 1, further comprising obtaining at least one wearer parameter,
    wherein the active filter is controlled according to the at least one wearer parameter.

10. The method according to claim 9, wherein the wearer parameter comprises at least one of an age of the wearer, a chronotype of the wearer, an activity of the wearer, ocular diseases of the wearer, and physiological disorders of the wearer.

11. The method according to claim 1, further comprising:
    obtaining a value of a predetermined threshold;
    the
    determining the light exposure profile of at least a part of the wearer's environment for a predetermined period based at least on the luminous cartography, at a time and at the wearer location; and
    comparing the determined light dose with the value of the predetermined threshold, and during which the active filter is controlled by the filter controller according to a result of a comparison between the determined light dose and the value of the predetermined threshold.

12. An active filtering device comprising:
    an active filter; and
    a filter controller configured to control the active filter by being configured to:

obtain a wearer location of a wearer,
obtain a luminous cartography relating to light sources in an environment of the wearer, the luminous cartography depending at least on the location of the wearer,
determine at least one part of a light exposure profile of the wearer based at least on the luminous cartography and on the wearer location, and
control the active filter according to the determined light exposure profile of the wearer.

13. The active filtering device of claim 12, wherein the active filtering device is a component of a network system comprising at least the active filtering device and a distant entity,
wherein the active filtering device and the distant entity being configured to communicate one with the other,
the distant entity comprising a storage configured to store at least one computer program product comprising one or more stored sequences of instructions that when executed by the filter controller of the active filter, causes the filter controller to control the active filter at least according to the determined light exposure profile of a wearer.

14. The active filter device of claim 12, wherein the active filtering device is a component of an eyewear.

15. A non-transitory computer storage medium storing one or more stored sequences of instructions that are accessible to a filter controller of an active filtering device, and which, when executed by the filter controller, causes the filter controller to control an active filter of the active filtering device to perform a method comprising:
obtaining a wearer location of a wearer;
obtaining a luminous cartography relating to light sources in an environment of the wearer, the luminous cartography depending at least on the location of the wearer;
determining at least one part of a light exposure profile of the wearer based at least on the luminous cartography and on the wearer location; and
controlling an active filter by the filter controller according to the determined light exposure profile of the wearer.

16. The active filtering device of claim 12, wherein the filter controller is further configured to define a luminous cartography in the environment of the wearer based on predetermined light sources data.

17. The active filtering device of claim 16, wherein the filter controller is further configured to measure a luminous cartography in the environment of the wearer by at least one light intensity sensor.

18. The active filtering device of claim 17, wherein the filter controller is further configured to calculate a luminous cartography in the environment of the wearer based at least on a light sources parameter of a predetermined light sources data.

19. The active filtering device of claim 18, wherein the filter controller is further configured to model a luminous cartography in the environment of the wearer based on models of light sources depending at least on a light sources parameter of a predetermined light sources data.

20. The active filtering device of claim 19, wherein the filter controller is further configured to determine a luminous cartography in the environment of the wearer by downloading light source data from a luminous cartography database at a distant entity.

* * * * *